United States Patent
Luo et al.

(10) Patent No.: US 6,631,212 B1
(45) Date of Patent: Oct. 7, 2003

(54) TWOSTAGE SCHEME FOR TEXTURE SEGMENTATION BASED ON CLUSTERING USING A FIRST SET OF FEATURES AND REFINEMENT USING A SECOND SET OF FEATURES

(75) Inventors: Jiebo Luo, Rochester, NY (US); Andreas E. Savakis, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/395,002

(22) Filed: Sep. 13, 1999

(51) Int. Cl.[7] .......................... G06K 9/62; G06K 9/46; G06K 9/36; G06K 9/42; G06K 9/56

(52) U.S. Cl. ................. 382/228; 382/195; 382/240; 382/257; 382/308

(58) Field of Search ..................... 382/108, 131, 382/132, 190, 95, 224, 225, 227, 228, 257, 263, 266, 308, 240; 345/582, 583

(56) References Cited

U.S. PATENT DOCUMENTS 5,815,198 A * 9/1998 Vachtsevanos et al. ..... 348/125
6,105,015 A * 8/2000 Nguyen et al. ............. 706/15

OTHER PUBLICATIONS

Zhang et al, Wavelet–based Multiresolution Stochastic Image Models, Nov. 1995, IEEE Proceedings ISBN: 0–8186–7190–4, pp. 479–484.*

Bouman et al, Multiple Resolution Segmentation of Textured Images, Feb. 1992, IEEE transactions ISBN: 0162–8828, vol. 13, No. 2, pp. 99–113.*

"Texture Classification and Segmentation Using Multiresolution Simultaneous Autoregressive Models" by Jianchang Mao and Anil K. Jain. Pattern Recognition, vol. 25, No. 2, pp. 173–188, 1992.

"Markov Random Field Models for Unsupervised Segmentation of Textured Color Images" by Dileep Kumar Panjwani and Glenn Healey. IEEE Transaction on Pattern Analysis and Machine Intelligence, vol. 17, No. 10, Oct. 1995, pp. 939–954.

"Integrated Approach to Texture Segmentation Using Multiple Gabor Filters" by Thomas P. Weldon and William E. Higgins(4 Pages).

"Texture Classification and Segmentation Using Wavelet Frames" by Michael Unser. Transactions on Image Processing, vol. 4, No. 11, Nov. 1995, pp. 1549–1560.

"A Robust Automatic Clustering Scheme for Image Segmentation Using Wavelets" by Robert Porter and Nishan Canagarajah. IEEE Transactions on Image Processing, vol. 5, No. 4, Apr. 1996, P 662–665.

"Texture Segmentation using Multiscale Hurst Features" by Lance M. Kaplan and Romain Murenzi. 1997 IEEE, pp. 205–208.

"Image Processing, Analysis, and Machine Vision" by Milan Sonka, Vaclav Hlavac and Roger Boyle. Brooks/Cole Publishing Company, 1999, Sections 7.2 & 7.3.

\* cited by examiner

Primary Examiner—Mehrdad Dastouri
(74) Attorney, Agent, or Firm—David M. Wood (57) ABSTRACT

A method and system for segmenting textures in an image includes computing multiresolution simultaneous autoregressive (MSAR) features in the image, preparing an uncertainty map of the MSAR features (the uncertainty map including high confidence pixels and low confidence pixels), computing wavelet features in the image, preparing a classifier based on the high confidence pixels and the wavelet features, and reclassifying the low confidence pixels based on the classifier to obtain the final segmentation.

15 Claims, 10 Drawing Sheets

Fig. 9 error: 4.4%

Fig. 11

Fig. 13 error: 2.1%

Fig. 17 error: 6.2%

Fig. 18 error: 3.2%

Fig. 29 error: 4.3%

Fig. 24 error: 4.3%

Fig. 26

Fig. 28 error: 2.8%

TWO STAGE SCHEME FOR TEXTURE SEGMENTATION BASED ON CLUSTERING USING A FIRST SET OF FEATURES AND REFINEMENT USING A SECOND SET OF FEATURES

FIELD OF THE INVENTION

The present invention generally relates to photo segmentation and object extraction using texture classification performed with a novel combination of multiresolution simultaneous autoregressive texture segmentation and a wavelet classification.

BACKGROUND OF THE INVENTION

Texture is a fundamental characteristic of natural images that, in addition to color, plays an important role in human visual perception and in turn provides information for image understanding and scene interpretation. A number of texture features have been developed to represent texture characteristics for texture classification and segmentation, including multiresolution simultaneous autoregressive models (MSAR) (Mao et al. "Texture Classification and Segmentation Using Multiresolution Simultaneous Autoregressive Models," *Pattern Recognition*, Vol. 25, No. 2, pp. 173–188, 1992), Markov random field (MRF) models (Panjwani et al. "Markov Random Field Models for Unsupervised Segmentation of Texture Color Images," *IEEE Trans. Pattern Anal. Mach. Intel.*, Vol. 17, pp. 939–954, October 1995), Gabor filters (Weldon et al. "Integrated Approach to Texture Segmentation Using Multiple Gabor Filters," *In Proc. IEEE Int. Conf. Image Process.*, 1997), and wavelet coefficients (Unser, "Texture Classification and Segmentation Using Wavelet Frames," *IEEE Trans. Image Process.*, Vol. 4, pp. 1549–1560, November 1995; and Porter et al. "A Robust Automatic Clustering Scheme for Image Segmentation Using Wavelets," *IEEE Trans. Image Process.*, Vol. 5, pp. 662–665, April 1996), all of which articles are incorporated herein by reference.

PROBLEM TO BE SOLVED BY THE INVENTION

While each of these texture features has certain unique advantages, one common problem in using them for image segmentation is that noise in the extracted features may result in misclassification, that takes the form of holes and other fragments. Another interesting, yet challenging, problem in texture segmentation is what may be called the boundary effect. It usually appears as inaccurate segmentation of boundaries or superfluous narrow regions between two textures. It is conjectured that such a boundary effect is caused by misclassification when the trajectory of the feature vectors makes a transition through feature space (Weldon et al. supra). To make matters worse, the misclassification may be interpreted as a third texture, depending on the nature of the features present in a particular image.

Through the invention, a two-stage segmentation approach is utilized to identify and reclassify potential problem regions. Below, the inventive initial segmentation method is described, which is an improved way of normalizing MSAR features.

SUMMARY OF THE INVENTION

It is, therefore, an object of the present invention to provide a structure and method for photo segmentation and object extraction. As would be known by one ordinarily skilled in the art given this disclosure, the inventive two-stage scheme can be generalized beyond MSAR and wavelet features. The criterion for selecting two sets of features could be based on the requirements that the first set of features should have high signal-to-noise ratio in the interior of homogeneous textured regions, and the second set of features should have high spatial resolution.

A single set of features is unlikely to have both properties due to the fact that texture is an area-oriented characteristic and texture features are computed within a local neighborhood. On one hand, features based on larger local neighborhood windows capture longer correlation and therefore are more robust, but otherwise suffer from poor spatial resolution near boundaries between textures. On the other hand, features based on smaller local neighborhood windows tend to have better spatial resolution but may not be as robust to noise and subtle textural differences.

An embodiment of the invention is a method of segmenting textures in an image which includes a first process of identifying first features in the image (the first process has a first spatial support), preparing an uncertainty map of the first features (the uncertainty map includes first confidence pixels and second confidence pixels, and the first confidence is higher than the second confidence), a second process of identifying second features in the image (the second process having a second spatial support smaller than the first spatial support), preparing a classifier based on the first confidence pixels and the second features, and reclassifying the second confidence pixels based on the classifier to segment the textures.

The first spatial support has a signal to noise ratio higher and a resolution lower than that of the second spatial support. The inventive method further includes weighting the first features based on a ratio of between-class variance to within-class variance of the image and edge-filtering variance within the image to remove feature inhomogeneity associated with texture boundaries. The first process of identifying the first features includes a multiresolution simultaneous autoregressive (MSAR) modeling operation. The second process of identifying the second features includes a wavelet modeling operation. After the MSAR modeling operation, MSAR coefficients are clustered using unsupervised segmentation. The inventive method further includes, after the clustering of the MSAR coefficients, a morphological erosion operation.

Another embodiment of the invention is the segmenting of textures in an image which includes computing multiresolution simultaneous autoregressive (MSAR) features in the image, preparing an uncertainty map of the MSAR features (the uncertainty map includes first confidence pixels and second confidence pixels, and the first confidence is higher than the second confidence), computing wavelet features in the image, preparing a classifier based on the first confidence pixels and the wavelet features, and reclassifying the second confidence pixels based on the classifier to segment the textures.

Another embodiment of the invention is the segmenting of textures in an image which includes computing multiresolution simultaneous autoregressive (MSAR) features in the image, preparing a confidence map of the MSAR features, computing wavelet features in the image, producing a refined confidence map based on the wavelet features, and segmenting the textures based on the refined confidence map.

A further embodiment of the invention is a computer system for segmenting textures in an image which includes a first processor identifying first features in the image (the first processor has a first spatial support), a mapping unit preparing an uncertainty map of the first features (the uncertainty map includes first confidence pixels and second confidence pixels, and the first confidence is higher than the second confidence), a second processor identifying second features in the image (the second processor has a second spatial support smaller than the first spatial support), a classification unit forming a classifier based on the first confidence pixels and the second features, and a segmentor reclassifying the second confidence pixels based on the classifier.

The inventive two-stage segmentation scheme is designed to play to the strength of two sufficiently different sets of texture features while overcoming their drawbacks. Combined with an efficient way of identifying "uncertain" regions where misclassification is likely to occur, and a self-supervised training mechanism, the invention offers an alternative superior to postprocessing by morphological operations alone.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

In general, the signal-to-noise ratio of wavelet features is not as high as for multiresolution simultaneous autoregression (MSAR) features, and the MSAR features have a higher resolution than the wavelet features (e.g., they have different spatial supports). As a result, the segmentation maps obtained using wavelet features often appear more noisy than those obtained using MSAR features. Moreover, wavelet features cannot differentiate certain textures that are similar in terms of short correlation (e.g., see FIG. 4, discussed below). On the other hand, MSAR features are capable of capturing correlation over long distances but often fall short at texture boundaries.

The invention takes the foregoing into account and uses areas where the wavelet and MSAR features complement each other in a two-stage segmentation approach. The initial segmentation map is obtained through unsupervised clustering of the MSAR features which produces a confidence map. The inventive training of the wavelet classifier can be considered as self-supervised according to the "confidence" map. The reclassification is finally based on most similar adjacent wavelet feature criterion, as discussed in greater detail below. With the invention, the simple most similar neighbor classifier for refinement is used. For each class present in the multi-level confidence map, all the "high confidence" pixels serve as training samples and are used to determine the corresponding texture class centroids in the wavelet feature space.

As is known in the art, the simultaneous autoregressive (SAR) model for image representation is formulated by $$f(i, j) = \sum_{(p,q) \in R} \alpha(p, q) f(i+p, j+q) + w(i, j) \qquad (1)$$

where f(i,j) denotes the intensity of an image pixel at location (i,j), α(p, q) denotes a weighting coefficient, R is the neighborhood region, and w(i, j) is zero-mean Gaussian noise with variance $\sigma^2$. The mean value of the image intensity has been subtracted. For a given neighborhood R, the model parameters $\alpha$(p, q) and $\sigma^2$ may be computed via least square estimation (LSE) or maximum likelihood estimation (MLE). To reduce by half the number of SAR coefficients that need to be computed, a symmetric model is used, where $\alpha$(p,q)=$\alpha$(q,p). The resulting coefficients and noise standard deviation are used as features for texture modeling and segmentation of gray scale images.

When processing color images, the SAR coefficients are computed from the intensity or luminance image. To obtain a better estimate of the SAR parameters, the regression is performed over a local window centered at the pixel of interest. The size of the local window should be large enough to allow for accurate and reliable capture of the texture characteristics and small enough to reduce the effects of texture variability over the image.

Two major difficulties in utilizing the SAR model are choosing a proper neighborhood size, within which pixels are considered interdependent, and selecting a proper window size in which the texture is assumed to be homogeneous and the parameters of the SAR model are estimated. A small neighborhood or window may not be adequate for capturing large-scale textures, while an unnecessarily large neighborhood or window may introduce severe averaging effects, which tend to degrade the discriminatory power of the SAR parameters. For example, empirical studies have found that a 21×21 window is, in general, good for the SAR model.

Multiresolution SAR (MSAR) was proposed as a means to deal with the above problems, Mao et al. supra. If an image with a coarse texture is subsampled, an SAR model with a small neighborhood will fit the subsampled image well, since two neighboring pixels in the subsampled image are several pixels apart in the original image. Therefore, it is known that using SAR models at different resolution levels can provide discriminatory power for a variety of texture types.

However, the MSAR coefficients tend to be noisy due to in-homogeneity of the input texture, and need to be normalized before they are used for segmentation. Additionally, the contrast between features of different texture types may not be optimal for a particular segmentation or classification algorithm. Moreover, the discriminatory power of each feature may not be the same. The normalization procedures used in Mao et al., supra, are local averaging, nonlinear transformation, and feature weighting. The procedures used with the invention include local averaging, a nonlinear transformation that employs a sigmoidal function, as in J. Mao et al., an improved method of feature weighting that is described below, and final feature smoothing.

With the invention, feature weighting is used to emphasize the best features. A feature is considered "good" for segmentation if its within-class variance is small while its between-class variance is large. Previous systems, such as that disclosed in Mao et al., supra, assumed that homogeneous textured regions in the images are relatively large in comparison to texture boundaries. Therefore, a good feature should have a small variance within homogeneous textured regions and a large variance over the entire image. For the kth feature image, the feature weight is given by $$W_k = \text{var}^k_{global} / \text{var}^k_{local}, \qquad (2)$$

where $$\text{var}^k_{global} = \frac{1}{M^2} \sum_s \left( f_k(s) - \hat{f}_k \right)^2, \text{ and} \qquad (3)$$

$$\text{var}^k_{local} = \frac{1}{N} \sum_s \left( \frac{1}{p^2} \sum_{s \in N_s} \left( f_k(s) - \tilde{f}_k \right)^2 \right) \qquad (4)$$

where $\hat{f}_k$ is the mean of the feature over the given M×M image, and $\tilde{f}_k$ is the local mean within a P×P window, $N_s$, centered at site s. All N sites are chosen randomly over the M×M image. For example in Mao et al., supra, P=16 and N=64.

If N is sufficiently large, the measure $w_k$ is greater than or equal to one. Therefore, $w_k$ can be viewed as an estimate of the ratio of between-class variance to within-class variance. However, at texture boundaries, the local variance can become so large that it may skew or inflate the average local variance over the entire feature image. This is especially true when the above-mentioned assumption (that homogeneous textured regions in the images are relatively large in comparison to texture boundaries) is incorrect.

To overcome this problem, the invention proposes an edge-filtered, non-random way of determining the average local variance. With the invention, if the local variance of a given window is above a predetermined threshold, it does not contribute to the computation of the average local variance because the large variance is attributed to texture inhomogeneity that is usually found at the boundary between textures. Consequently, the edge-filtered local variance reflects more accurately how homogeneous a feature is within the interior of texture regions. Utilizing edge-filtered local variance is better for selecting discriminatory features. The edge-filtered weighting factors are more consistent with the visual interpretation of the discriminating power of the features, while the non-edge filtered weighting factors used previously in Mao et al., supra, can sometimes be contrary to visual interpretation.

The clustering of MSAR coefficients is done via unsupervised segmentation, where the partition of the feature space is purely determined by within-class and between-class Euclidean-like distances, and leads to a simple Voronoi partition. A simple k-means algorithm (e.g., see Sonka et al., "Image Processing, Analysis, and Machine Vision," PWS Publishing, Pacific Grove, Calif., p. 308, incorporated herein by reference) is used to perform the segmentation. For general segmentation applications not targeted on specific objects or materials, one does not have any specific knowledge of the image content. Moreover, one usually does not even know exactly how many types of materials or objects are in the image. The invention uses a segmentation confidence map, described below, to improve the segmentation.

In texture segmentation, researchers have noticed the appearance of narrow regions (due to misclassification,) that form a third texture for pixels near the boundary between two textures. Thus, morphological operations have been used to clean up the segmentation maps. For example, in Weldon et al., supra, "m-ary" morphological operations are used as postprocessing to reduce these narrow misclassified regions. Note that "m-ary" operations are needed because the segmentation map usually is not simply binary. However, generic grayscale morphological operations are not suitable since they produce intermediate levels that have no meaning for a segmentation map.

Therefore, Weldon et al., supra, defines two operations, M-erosion and M-dilation. In the M-erosion operation, pixels whose neighbors have textures in the same class are left unchanged, otherwise the pixel is labeled "uncertain," i.e. there is low confidence in the classification result. Labeling is done by assigning zero value to the "uncertain" pixels while all other segmentation regions retain non-zero values. In the M-dilation operation, "uncertain" pixels are assigned a texture that is the most common class within an 8-neighborhood (e.g., the four perpendicular (up, down, left and right) and four diagonal adjacent pixels).

In essence, application of M-erosion followed by M-dilation propagates "certain" regions into the "uncertain" areas based on spatial proximity. M-erosion and M-dilation are arguably the most reasonable conventional solutions for resolving uncertainty, without further information.

Misclassification often stems from the fact that texture feature extractors are area-based, and a third (e.g., incorrect) texture is what the extractor interprets when its window is positioned on two different textures. One method for boundary refinement is to use smaller window sizes near texture boundaries, Kaplan et al., "Texture Segmentation Using Multiscale Hurst Features," In *Proc. IEEE Int. Conf: Image Process.*, 1997, incorporated herein by reference.

The boundary refinement process in Kaplan et al. starts by setting $W_b=W$ and utilizes the segmentation map, as obtained from initial clustering, to find regions of thickness $W_b$ around changes in classification. These regions correspond to either boundary areas or small holes. For each pixel in the identified regions, texture features are recalculated using a window of size $W_b/2$. Then, the pixel is reclassified according to the distance to locally available cluster centroids, including its original class label and the class labels that fill at least 25% of a window of size $W_b$ centered at the current pixel. The refinement procedure continues by reducing the window size by a factor of two and repeating the above process until a minimum window size is reached, which is still sufficiently large to compute useful features. For example, the window size can be as small as $W_b=5$, Kaplan et al., supra, for different types of texture features.

However, MSAR features become rather noisy and unstable once the window size is smaller than 11×11. As mentioned above, in general, a 21×21 window is a good compromise among several concerns, and using an increasingly smaller window is not feasible for MSAR. Alternatively, the highest resolution MSAR features can be used to reclassify the boundary pixels. Moreover, using the highest resolution MSAR features alone does not produce any improvement in segmentation of boundaries.

Wavelet features have also been used as alternative features for texture classification. Wavelet features are fundamentally different than neighborhood-based MSAR and MRF types of texture features and capture the texture characteristics in a different way. Further, wavelet features are more sensitive to higher resolution variations because of relatively smaller spatial support. Furthermore, the computational cost of wavelet features is low compared to MSAR. Gabor filters share a similar spirit of scale-orientation analysis and provide features for more than one orientation. Both Gabor and wavelet features have been used for texture segmentation (e.g., see Weldon et al., supra, and Porter et al., supra).

In one example which demonstrates the benefits of the invention, a 3-level wavelet decomposition of the image is performed using Daubechies 9/7 biorthogonal wavelets and a 9-dimensional feature vector is constructed by properly interpolating nine high frequency subbands. Before interpolation, subband coefficients are replaced by their absolute values and are smoothed using, for example, a 3×3 local window.

Figure 1:
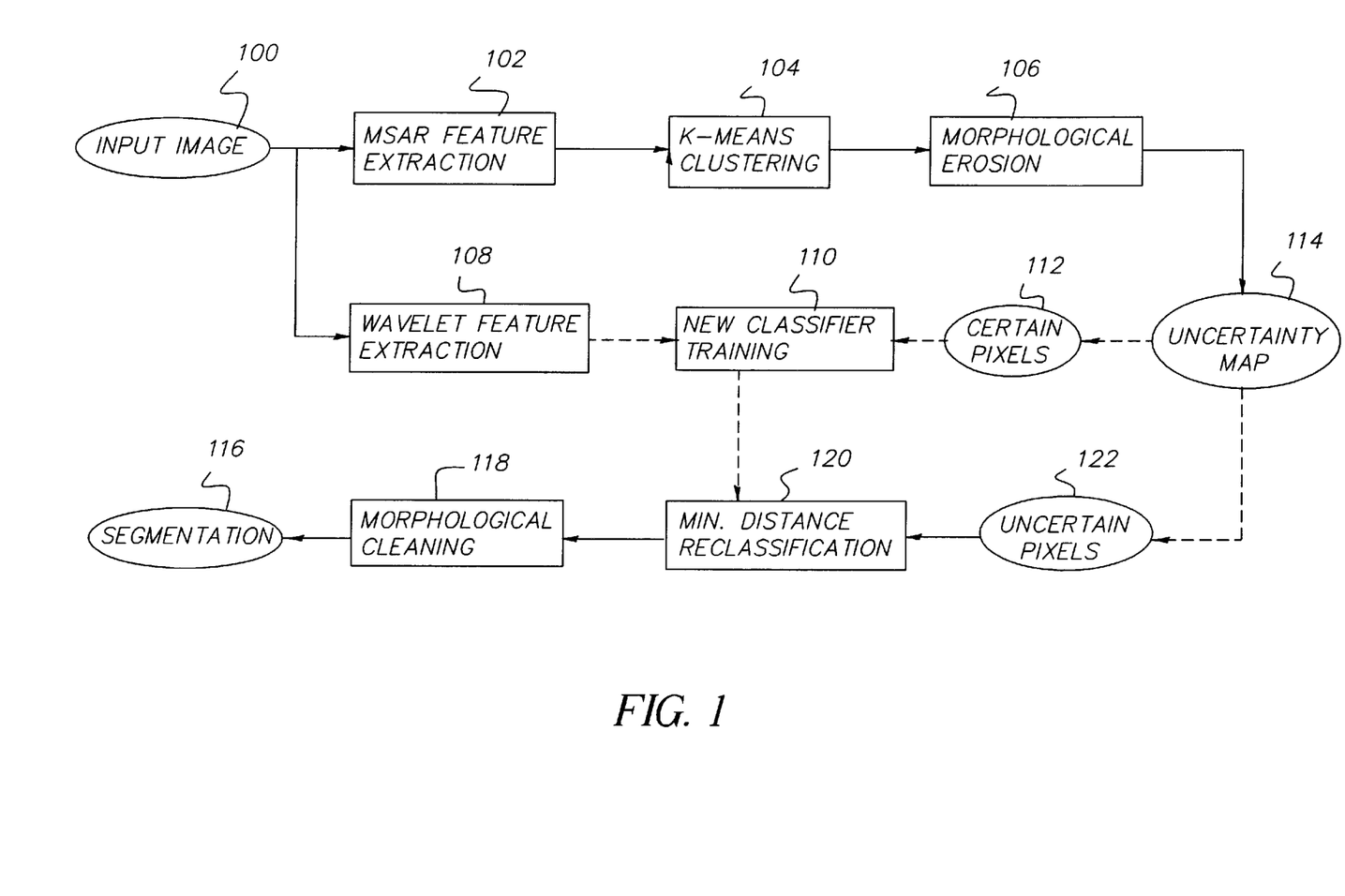
FIG. 1 is a flow diagram illustrating the stages of the inventive joint segmentation.
Figure 9:
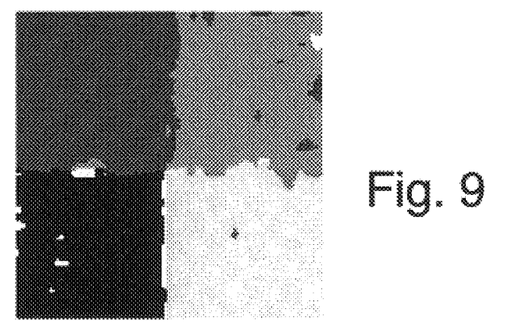
FIG. 9 represents the segmentation by MSAR of the four-patch mosaic.
Figure 10:
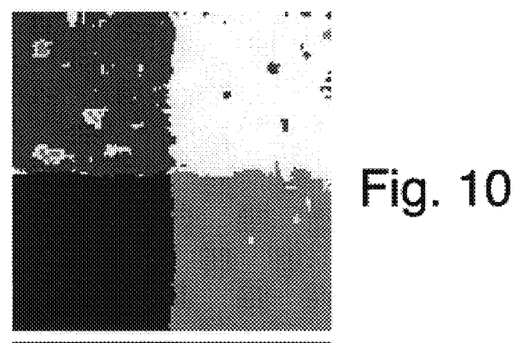
FIG. 10 represents the segmentation by wavelet features of the four-patch mosaic.
Figure 17:
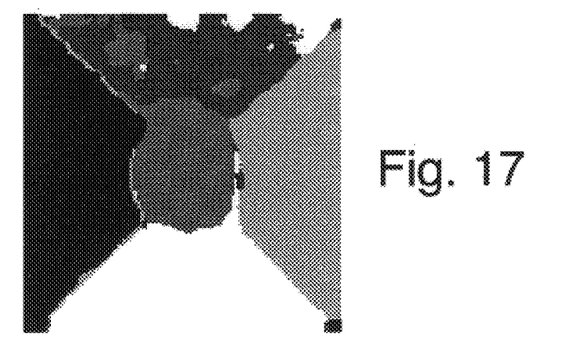
FIG. 17 represents the segmentation by MSAR of the five-patch mosaic.
Figure 18:
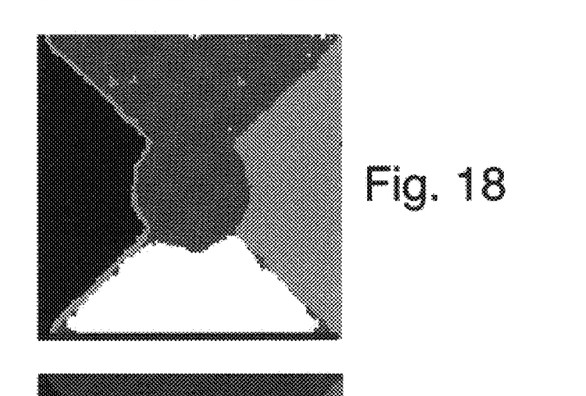
FIG. 18 represents the segmentation by wavelet features of the five-patch mosaic.
Figure 25:
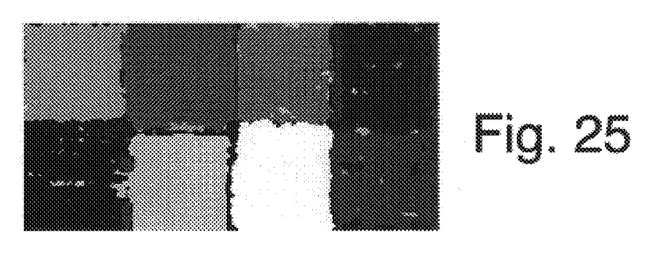
FIG. 25 represents the segmentation by MSAR of the eight-patch mosaic.
Figure 26:
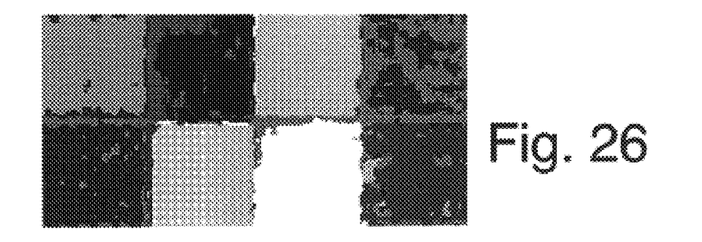
FIG. 26 represents the segmentation by wavelet features of the eight-patch mosaic.

The stages for the inventive joint segmentation are more specifically illustrated in FIG. 1, where the solid arrows indicate process flow and the broken arrows indicate information flow. In item 100, the image (e.g., FIG. 7, 15 or 23) is input to the system. As discussed above, the image is subject to a conventional MSAR feature extraction process, as shown in item 102 (e.g., FIGS. 9, 17 and 25). A wavelet feature extraction is also performed on the image, as shown in item 108 (e.g., FIGS. 10, 18 and 26).

Figure 8:
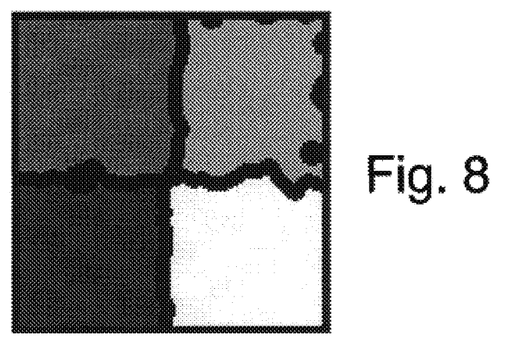
FIG. 8 represents the uncertainty map of the four-patch mosaic.
Figure 11:
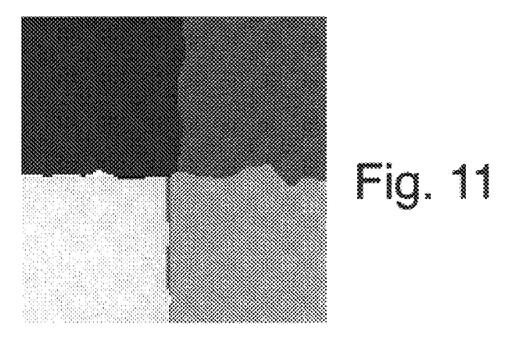
FIG. 11 represents the refined MSAR segmentation of the four-patch mosaic.
Figure 16:
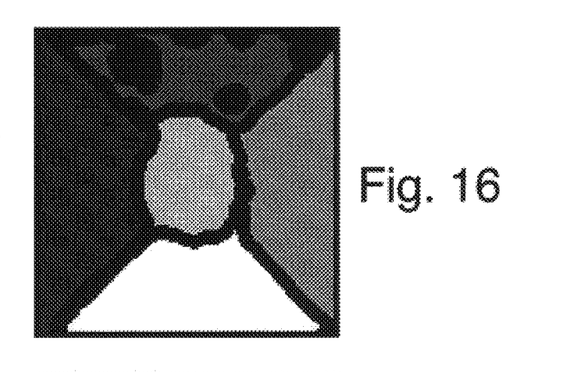
FIG. 16 represents the uncertainty map of the five-patch mosaic.
Figure 19:
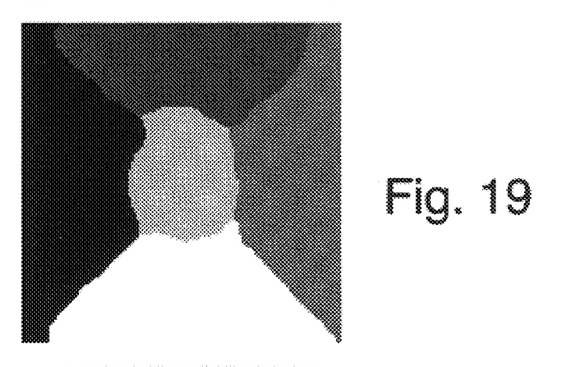
FIG. 19 represents the refined MSAR segmentation of the five-patch mosaic.
Figure 24:
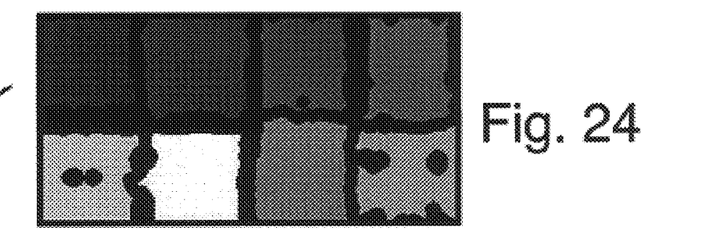
FIG. 24 represents the uncertainty map of the eight-patch mosaic.
Figure 27:
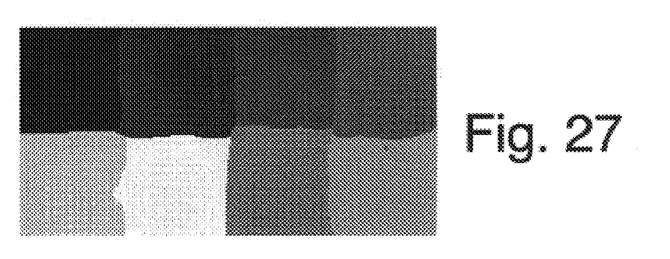
FIG. 27 represents the refined MSAR segmentation of the eight-patch mosaic.

The MSAR coefficients are clustered using, for example, simple k-means algorithms (e.g., item 104), as discussed above, and the clustered image is subjected to a morphological M-erosion operation to clean up the segmentation maps in item 106 (e.g., FIGS. 11, 19 and 27). The cleaned segmentation maps form the uncertainty map (item 114) where uncertain pixels are marked by "0" (e.g., the darkest level in FIGS. 8, 16 and 24). More specifically, as shown in FIGS. 8, 16 and 24, the darkest areas between different textures and along the outer border is the location where the uncertain pixels are located. The pixels which have a texture label that is known with certainty are processed through item 112 and the uncertain (e.g., low confidence) pixels are processed through item 122.

The wavelet features from item 108 and the high confidence (e.g., certain) pixels from item 112 are used in the classifier training 110 to reclassify the texture of the uncertain pixels of (in item 120). Item 110 results in a second classifier whose class centroids, in the wavelet texture space, are obtained through a training process using the wavelet features of adjacent high confidence pixels.

Thus, once the training I 10 is completed, a minimum wavelet texture difference classification 120 is applied to the uncertain pixels from item 122 to assign a texture class to each uncertain pixel. Each uncertain pixel is reclassified independently and simultaneously according to which adjacent wavelet texture classification is most similar to the uncertain pixel. The most similar adjacent wavelet classification is referred to herein as the minimum distance in wavelet feature space (120).

As would be known by one ordinarily skilled in the art given this disclosure, while the foregoing discusses assigning the most similar wavelet feature from the adjacent certain pixel textures to the uncertain pixel in such a minimum wavelet feature distance classification, other similar reclassification methods can be used, such as the maximum likelihood classification and other classifiers used in statistical pattern recognition, Sonka et al., supra, pp. 297–303 incorporated herein by reference.

A combination of morphological M-erosion and M-dilation with a small kernel is used in the end to perform minor cleaning of the segmentation map in item 118, which produces the more accurate segmentation, as shown in FIGS. 7–32.

Figure 2:
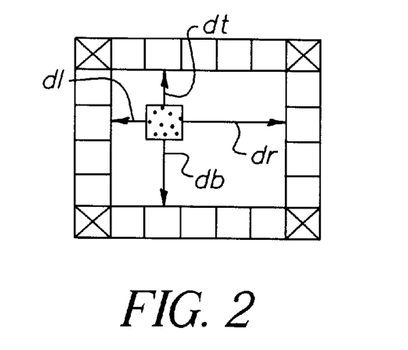
FIG. 2 is a schematic drawing illustrating the determination of spatially adaptive neighborhoods for reclassification.

An adaptive neighborhood window is used in the reclassification of uncertain pixels (item 120) to guarantee that holes and narrow strips do not exist in the final segmentation. As shown in FIG. 2, the adaptive neighborhood window for each identified "uncertain" pixel is determined by starting at the pixel itself (the solid black pixel), expanding a rectangular window by one pixel in each of the four directions in one expanding cycle (up (dt), down (db), left(dl), right (dr)) until, in a given direction, at least one of the following is true: a) an image border is reached by the rectangle, b) at least one of the recently expanded rectangle pixels (the white pixels), excluding corner pixels of the current rectangle (the shaded pixels, since they are on two sides of the rectangle at the same time), is a labeled pixel (e.g., a certain pixel) or c) a maximum search range is reached in a given direction. The overall expansion is continued until one of the following is true: a) for a non-corner pixel, expansion is not possible or necessary for at least a pair of opposite directions, or b) for a corner pixel, expansion is not possible or necessary in all directions. The adaptive neighborhood window is used to make sure that an uncertain pixel is assigned (in the reclassification process) to only locally seen texture classes. For example, as shown in FIG. 6, X can only be reclassified to class {R1,R2,R3} but not {R4,R5} (otherwise a hole is created).

Figure 3:
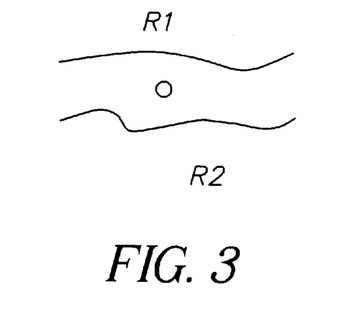
FIG. 3 is a schematic drawing illustrating the determination of spatially adaptive neighborhoods for reclassification.
Figure 4:
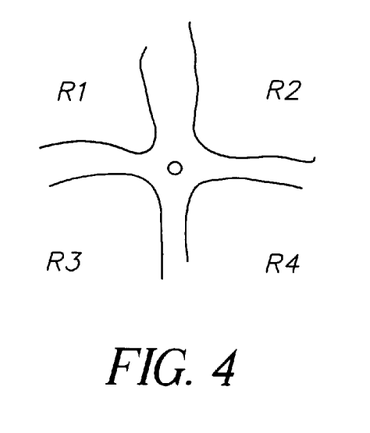
FIG. 4 is a schematic drawing illustrating the determination of spatially adaptive neighborhoods for reclassification.
Figure 5:
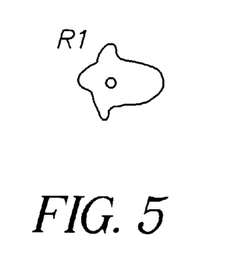
FIG. 5 is a schematic drawing illustrating the determination of spatially adaptive neighborhoods for reclassification.
Figure 6:
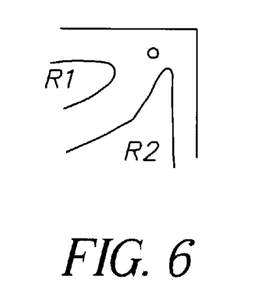
FIG. 6 is a schematic drawing illustrating the determination of spatially adaptive neighborhoods for reclassification.

FIGS. 3–6 illustrate the determination of some exemplary spatially adaptive neighborhoods which are presented for reclassification. FIG. 3 illustrates a boundary between texture regions R1 and R2; FIG. 4 illustrates an intersection between texture regions R1-R4; FIG. 5 illustrates a hole in texture region R1; and FIG. 6 illustrates a corner and texture regions R1 and R2.

In FIG. 3, the pixel would be reclassified to either R1 or R2. In FIG. 4, the pixel would be reclassified to either R1, R2, R3, or R4. In FIG. 5, the pixel would be reclassified to R1. In FIG. 6, the pixel would be reclassified either to R1,or R2. The central texture class depends on the minimum distance in wavelet feature space (e.g. most similar adjacent wavelet class). Therefore, the invention is fundamentally different than the m-dilation process, discussed above, which simply replaces the uncertain pixels with the physically closest certain pixel. To the contrary, the invention identifies adjacent pixels (textures) within a well-defined neighborhood and determines which certain texture is most similar to the uncertain pixel in question and reclassifies the uncertain pixel with the most similar wavelet texture feature.

Such a spatially adaptive neighborhood window ensures that an uncertain pixel is always reclassified to a locally available class. In particular, the requirement of searching for candidate classes in at least a pair of opposite directions, ensures that all of the immediately available classes, rather than just the closest class, are used. Using the closest class would produce the same effect as morphological M-dilation due to the sole use of spatial proximity.

The results of the invention, shown in FIGS. 7–32, are based on texture mosaic images composed of patterns from the Brodatz set in P. Brodatz, Textures—A Photographic Album for Artists and Designers, New York: Dover, 1966, incorporated herein by reference, where the size of each uniform texture patch is 128×128. In the first result, FIGS. 7–14 show the results for a four-patch mosaic with horizontal and vertical boundaries. Secondly, FIGS. 4a–4h show the results for a five-patch mosaic consisting of circular and diagonal boundaries. The actual texture class depends on the minimum distance in a multi-dimensional wavelet feature space. Finally, the results of the invention on an eight-patch mosaic are shown in FIGS. 25–32.

Figure 7:
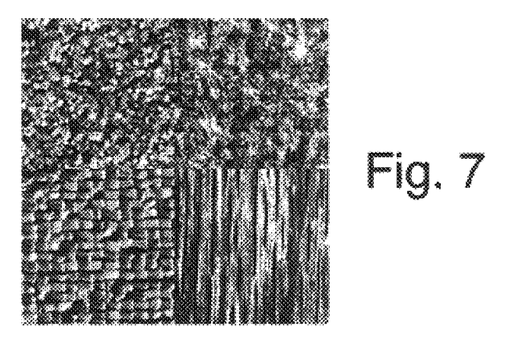
FIG. 7 represents the original image of a four-patch mosaic.
Figure 12:
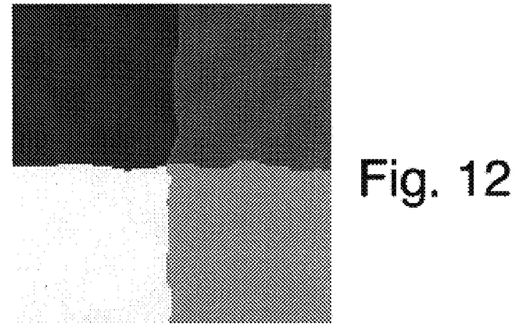
FIG. 12 represents the refined joint segmentation of the four-patch mosaic.
Figure 13:
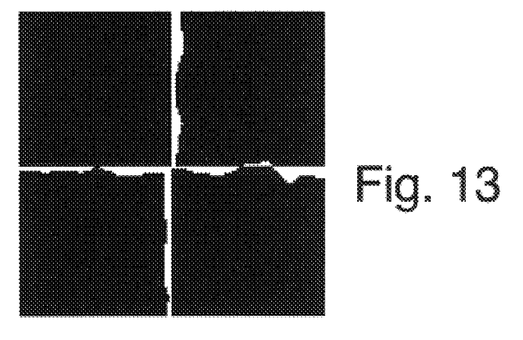
FIG. 13 represents the error in morphological refinement of the four-patch mosaic.
Figure 14:
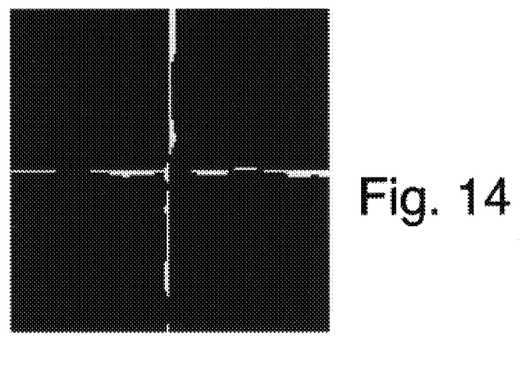
FIG. 14 represents the error in joint refinement of the four-patch mosaic.
Figure 15:
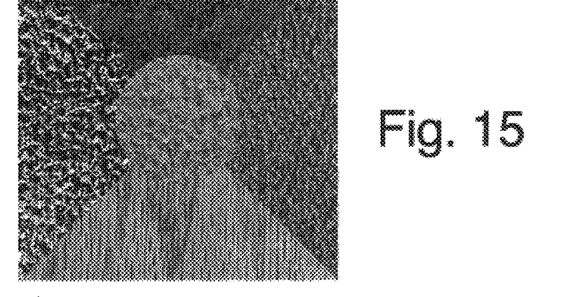
FIG. 15 represents the original image of a five-patch mosaic.
Figure 20:
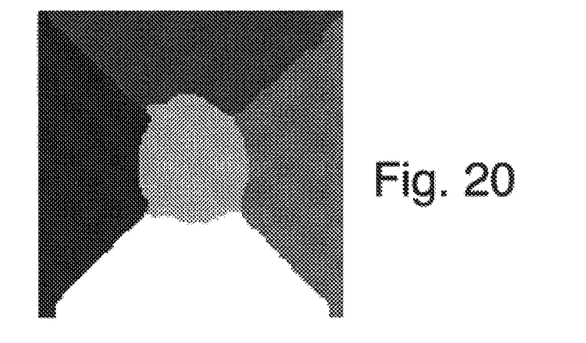
FIG. 20 represents the refined joint segmentation of the five-patch mosaic.
Figure 21:
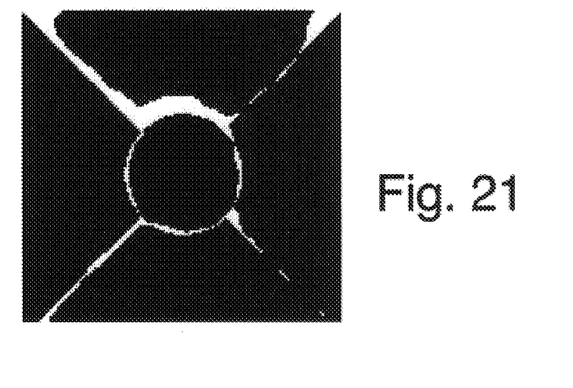
FIG. 21 represents the error in morphological refinement of the five-patch mosaic.
Figure 22:
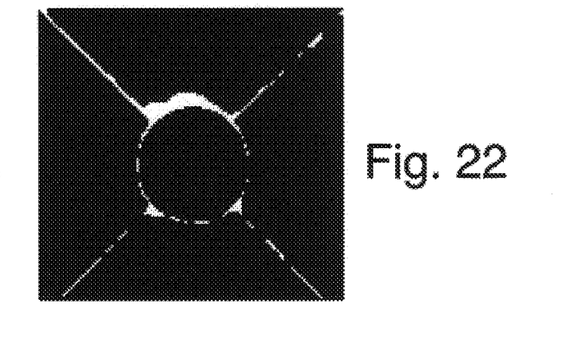
FIG. 22 represents the error in joint refinement of the five-patch mosaic.
Figure 23:
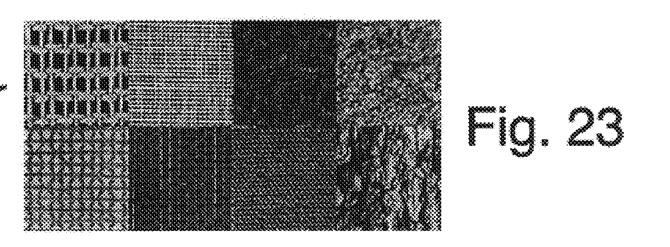
FIG. 23 represents the original image of an eight-patch mosaic.
Figure 28:
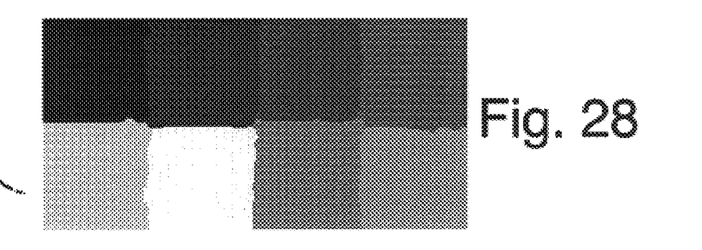
FIG. 28 represents the refined joint segmentation of the eight-patch mosaic.
Figure 29:
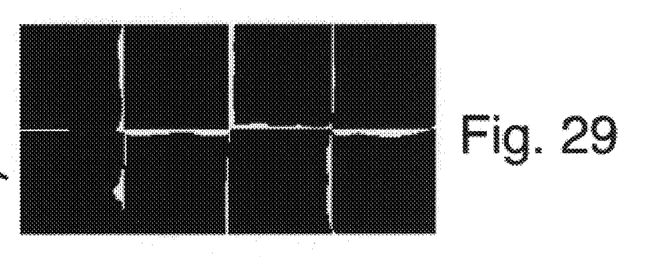
FIG. 29 represents the error in morphological refinement of the eight-patch mosaic.
Figure 30:
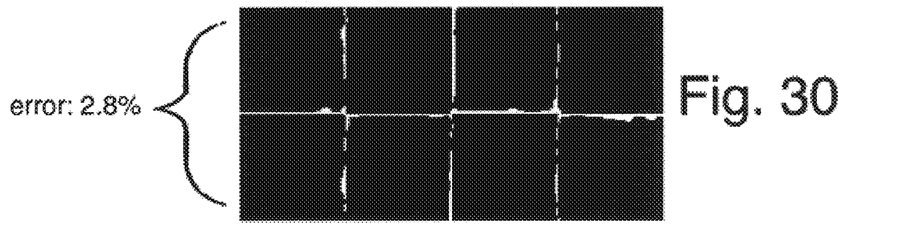
FIG. 30 represents the error in joint refinement of the eight-patch mosaic.
Figure 31:
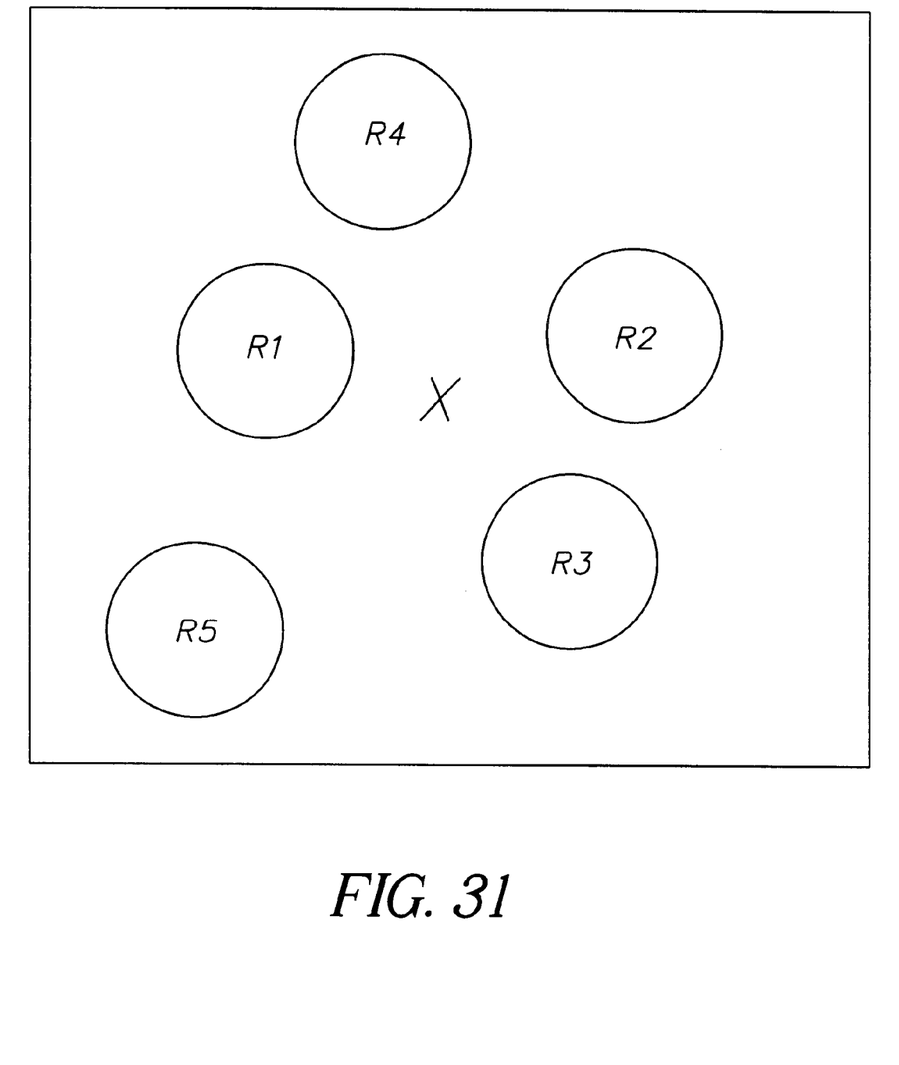
FIG. 31 illustrates the selection of locally seen texture classes for reclassification.

FIGS. 7, 15 or 23 show an original image to be segmented according to the invention. The uncertainty maps 114 (FIGS. 8, 16 and 24) are created by "m-ary" morphological erosion operations, as discussed above. The segmentation results by either MSAR (FIGS. 9, 17, and 25) 102 or wavelet features (FIGS. 10, 18 and 26) 108 that are obtained using, for example, a k-means clustering algorithm. In general, the segmentation maps by wavelet features (FIG. 10, 18 and 26) are more noisy and contain more fragments. Further, short correlations of the wavelet features may not be differentiated, as shown in the center and upper sections of FIG. 18, when compared to the texture changes shown in the original image FIG. 15. The final segmentation is obtained from morphologically cleaned MSAR segmentation (FIGS. 11, 19 and 27), Weldon et al., supra, and from the two-stage segmentation/refinement using MSAR and wavelet features, respectively (FIGS. 12, 20, and 28). Segmentation error maps (e.g., error in morphological refinement—FIGS. 13, 20 and 29; and error in the inventive joint refinement— FIGS. 14, 21, 30) are also shown for a visual comparison of the results obtained from the two methods.

These experimental results have shown the efficacy of the inventive segmentation approach in generating significantly more accurate segmentation than using each set of features alone for a variety of textures. Moreover, the improvement is superior to morphological postprocessing that is solely based on spatial proximity. In many cases, the error in MSAR segmentation appears as a boundary shift due to perhaps the uncertainty associated with large windows. As shown above, such a boundary shift cannot be resolved by using morphological operations alone.

The inventive self-supervised reclassification proves to be effective, as shown by FIGS. 7–30. Although wavelet features alone are not able to resolve two similar textures in FIG. 15 under unsupervised k-means clustering, the textures can be separated by the inventive self-supervised reclassification, with the help of spatial constraints.

Figure 32:
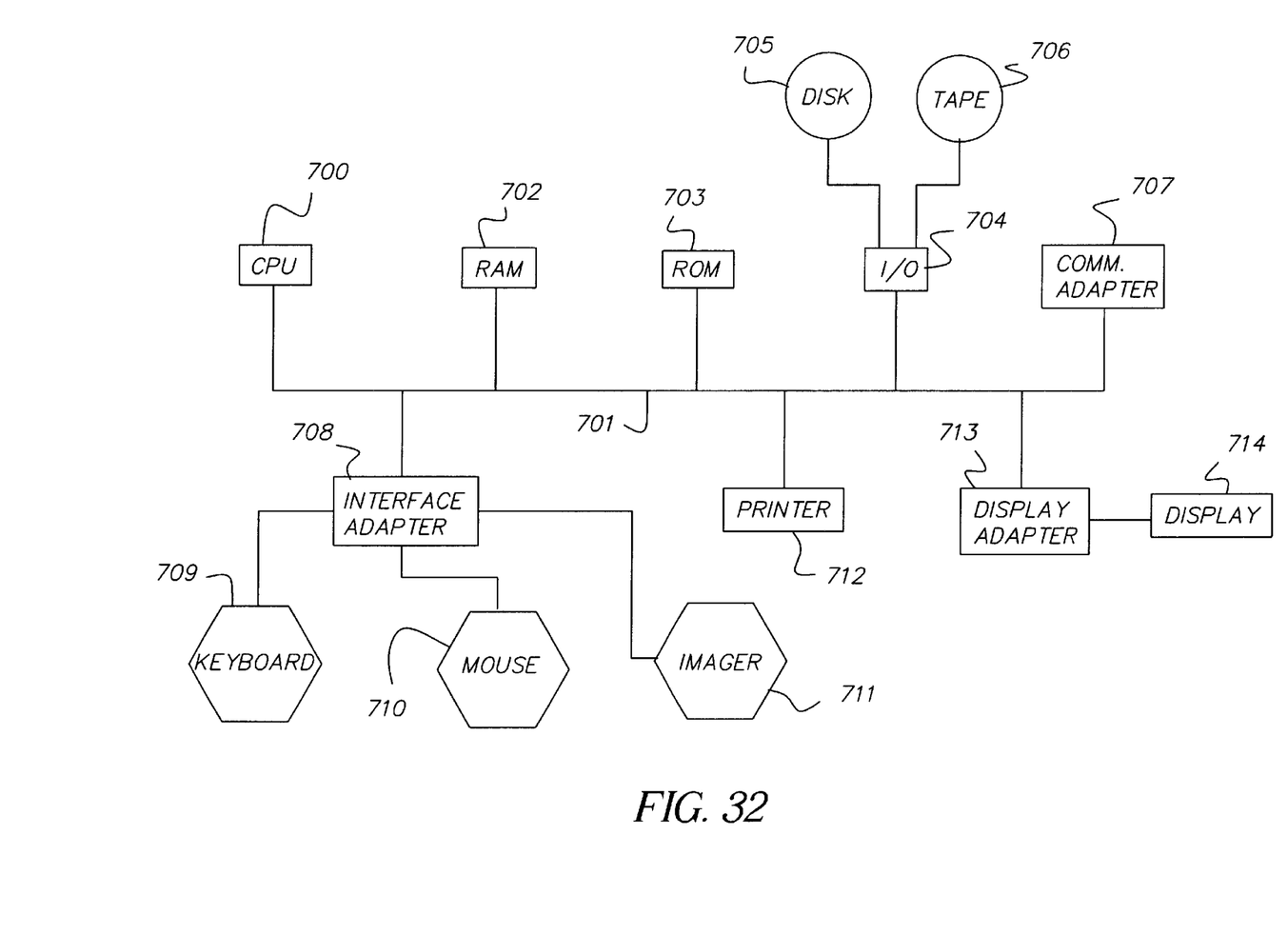
FIG. 32 is a schematic drawing illustrating a computer system embodiment of the invention.

While the overall methodology of the invention is described above, the invention can be embodied in any number of different types of systems and executed in any number of different ways, as would be known by one ordinarily skilled in the art. For example, as illustrated in FIG. 32, a typical hardware configuration of an information handling/computer system in accordance with the invention preferably has at least one processor or central processing unit (CPU) 700. For example, to perform the function of the invention, the central processing unit 700 could include various image/texture processing units, mapping units, weighting units, classification units, clustering units, morphing units, filters, adders, subtractors, comparators, etc. Alternatively, as would be known by one ordinarily skilled in the art given this disclosure, multiple specialized CPU's (or other similar individual functional units) could perform the same processing, mapping, weighting, classifying, clustering, morphing, filtering, adding, subtracting, comparing, etc.

The CPU 700 is interconnected via a system bus 701 to a random access memory (RAM) 702, read-only memory (ROM) 703, input/output (I/O) adapter 704 (for connecting peripheral devices such as disk units 705 and tape drives 706 to the bus 701), communication adapter 707 (for connecting an information handling system to a data processing network) interface adapter 708 (for connecting peripherals 709–711 such as a keyboard, mouse, imager, microphone, speaker and/or other interface device to the bus 701), a printer 712, and display adapter 713 (for connecting the bus 701 to a display device 714). In one embodiment, the invention could be implemented using the structure shown in FIG. 32 by including the inventive method, described above, within a computer program stored on the storage device 705. Such a computer program would act on an image supplied through the interface units 709–711 or through the network connection 707. The system would then automatically segment the textures and output the same on the display 714, through the printer 712 or back to the network 707.

Thus, as described above, the invention is a two-stage texture segmentation that improves upon the results obtained by MSAR segmentation alone. An initial segmentation map is obtained through unsupervised clustering of MSAR features, where an improved coefficient normalization procedure is used. The regions of "high confidence" and "low confidence" are then identified on the segmentation map using multilevel morphological erosion. A new wavelet classifier is trained from the "high confidence" samples and is used to reclassify only the "low confidence" pixels. The, training of the new wavelet classifier can be considered self-supervised according to the "confidence" map. The final reclassification is based on minimum distance (e.g., most similar adjacent wavelet) and spatial constraints. This approach leverages on the advantages of both MSAR and wavelet features, as well as an adaptive neighborhood based spatial constraint. Experimental results have shown that the misclassification error can be reduced by half compared to morphological cleaning operations alone.

Further, with the invention, accurate segmentation leads to accurate separation of different objects in an image. A number of properties (e.g., area, perimeter, shape, size) can then be accurately quantified for each object.

While the invention has been described in terms of preferred embodiments, those skilled in the art will recognize that the invention can be practiced with modification within the spirit and scope of the appended claims.

What is claimed is:

1. A method of segmenting textures in an image comprising:
    computing multiresolution simultaneous autoregressive (MSAR) features in said image;
    preparing an uncertainty map of said MSAR features, said uncertainty map including first confidence pixels and second confidence pixels, said first confidence being higher than said second confidence;
    computing wavelet features in said image;
    preparing a classifier based on said first confidence pixels and said wavelet features; and
    reclassifying said second confidence pixels based on said classifier to segment said textures.

2. The method in claim 1, further comprising weighting said MSAR features based on a ratio of between-class variance to within-class variance of said image.

3. The method in claim 1, further comprising edge-filtering variance within said image to remove feature inhomogeneity associated with texture boundaries.

4. The method in claim 1, further comprising, after said modeling of said MSAR features, clustering MSAR coefficients using unsupervised segmentation.

5. The method in claim 4, further comprising, after said clustering of said MSAR coefficients, a morphological erosion operation.

6. A computer program product for segmenting textures in an image, said computer program product comprising a computer readable storage medium having a computer program stored thereon for performing the steps of:
    computing multiresolution simultaneous autoregressive (MSAR) features in said image;
    preparing an uncertainty map of said MSAR features, said uncertainty map including first confidence pixels and second confidence pixels, said first confidence being higher than said second confidence;
    computing wavelet features in said image;
    preparing a classifier based on said first confidence pixels and said wavelet features; and
    reclassifying said second confidence pixels based on said classifier to segment said textures.

7. The computer program product in claim 6, further comprising weighting said MSAR features based on a ratio of between-class variance to within-class variance of said image.

8. The computer program product in claim 6, further comprising edge-filtering variance within said image to remove feature inhomogeneity associated with texture boundaries.

9. The compute program product in claim 6, further comprising, after said modeling of said MSAR features, clustering MSAR coefficients using unsupervised segmentation.

10. The compute program product in claim 9, further comprising, after said clustering of said MSAR coefficients, a morphological erosion operation.

11. A system for segmenting textures in an image comprising:
    a first feature extraction stage for computing multiresolution simultaneous autoregressive (MSAR) features in said image;
    a mapping stage for preparing an uncertainty map of said MSAR features, said uncertainty map including first confidence pixels and second confidence pixels, said first confidence being higher than said second confidence;
    a second feature extraction stage for computing wavelet features in said image;
    a classifier stage for preparing a classifier based on said first confidence pixels and said wavelet features; and
    a reclassifier stage for reclassifying said second confidence pixels based on said classifier to segment said textures.

12. The system in claim 11, further comprising means for weighting said MSAR features based on a ratio of between-class variance to within-class variance of said image.

13. The system in claim 11, further comprising means for edge-filtering variance within said image to remove feature inhomogeneity associated with texture boundaries.

14. The system in claim 11, wherein said mapping stage further comprises, after said modeling of said MSAR features, clustering MSAR coefficients using unsupervised segmentation.

15. The system in claim 14, wherein said mapping stage further comprises, after said clustering of said MSAR coefficients, a morphological erosion operation.

* * * * *